United States Patent [19]
Murray

[11] Patent Number: 6,061,659
[45] Date of Patent: May 9, 2000

[54] SYSTEM AND METHOD FOR INTEGRATING A MESSAGE INTO A GRAPHICAL ENVIRONMENT

[75] Inventor: Peter N Murray, New Canaan, Conn.

[73] Assignee: Digital Marketing Communications, Inc., Morristown, N.J.

[21] Appl. No.: 08/868,122

[22] Filed: Jun. 3, 1997

[51] Int. Cl.[7] .................................................. G06F 17/60
[52] U.S. Cl. ............................................ 705/14; 345/439
[58] Field of Search .......................... 705/14, 1; 345/326, 345/418, 439, 435

[56] References Cited

U.S. PATENT DOCUMENTS

| | | | |
|---|---|---|---|
| 5,105,184 | 4/1992 | Pirani et al. | 345/115 |
| 5,305,195 | 4/1994 | Murphy | 705/1 |
| 5,347,632 | 9/1994 | Filepp et al. | 395/200.32 |
| 5,353,392 | 10/1994 | Luquet et al. | 345/435 |
| 5,459,826 | 10/1995 | Archibold | 707/517 |
| 5,515,485 | 5/1996 | Luquet et al. | 345/435 |
| 5,555,308 | 9/1996 | Levien . | |
| 5,572,643 | 11/1996 | Judson . | |
| 5,613,109 | 3/1997 | Yamauchi et al. | 707/104 |
| 5,643,088 | 7/1997 | Vaughn et al. | 463/40 |
| 5,740,549 | 4/1998 | Reilly et al. | 705/14 |
| 5,946,664 | 8/1999 | Ebisawa | 705/14 |

OTHER PUBLICATIONS

Ubois, Jeff; "You get what you pay for? Advertising on the net not such a bargain", Digital Media, v5 n3 p3–7, Aug. 7 (4), 1995.

Riordan, Teresa, "Patents: Adding Some Value to Internet Ads," *New York Times*, Dec. 23, 1996.

*Primary Examiner*—Allen R. MacDonald
*Assistant Examiner*—Michele Stuckey Crecca
*Attorney, Agent, or Firm*—Darby & Darby PC

[57] ABSTRACT

A method and system of conveying information to a user in specified content displayed in an interactive graphical environment. The information comprises a predetermined message defined by message parameters to create an image and stored in a message memory. The content includes predetermined specifications for assimilating said message. The method comprises the steps of retrieving the specified content from a content memory then identifying the predetermined specifications from the content for substituting a portion of the content into a transformed representation of the predetermined message. After retrieving and identifying, the predetermined message is obtained from the message memory and transformed into a scaled message according to the specifications to substitute the message into the content portion and define a modified environment. After substitution, the method concludes by communicating the modified environment to the user, whereby the message, having been assimilated into the content, attracts substantial attention to effect improved cognitive processing and recall.

23 Claims, 6 Drawing Sheets

SYSTEM AND METHOD FOR INTEGRATING A MESSAGE INTO A GRAPHICAL ENVIRONMENT

FIELD OF THE INVENTION

The invention relates to methods and systems for interactively providing information to attract an individual's attention, and more particularly a method and system for automatically integrating a predetermined message into a selected graphical environment.

BACKGROUND OF THE INVENTION

Attracting public attention to specific information such as a commercial message typically involves a level of creative and communications expertise and knowledge of consumer psychology. The success or failure of a business endeavor often hinges on the public dissemination and follow-on awareness of a message related to the endeavor. If a message is compelling enough to warrant notice, the public is more likely to respond. However, should the information be conveyed in an uninteresting manner that fails to attract the attention of a consumer, expensive marketing campaigns may have little to no effect on consumer attitudes, behavior or other effects sought by the endeavor.

Traditional ways of conveying information or messages have evolved around conventional forms of mass media, namely print (newspapers and magazines), and broadcast (television and radio). Typically, a conventional advertising campaign consists of a small number of print ads and/or broadcast commercials directed at a target audience. Individuals exposed to the messages typically have varying cognitive responses based on the level of attention given the message, the saliency of the message, and the language and visual effects incorporated into the message. Mass distribution of the messages, whether by print and/or broadcast solicits the consumer attitudes, behavior or other effects sought by the endeavor to accomplish its objectives.

More recently, new forms of media have emerged. These relatively new technologies, including CD-ROMs, the Internet, and interactive television, enable individuals to interact with media, rather than passively experience one-way communication, characteristic of traditional print and broadcast. The most prominent of these new technologies is the Internet.

The Internet represents a vast computer network operating under the general framework of a client-server model. The network includes, generally, a plurality of interconnected computers or servers configured to store, transmit, and receive computer information. Designated servers host one or more "web sites" accessible electronically through a private Internet access provider or an on-line access provider. A unique address path or Uniform Resource Locator (URL) identifies individual web sites or pages within a web site. Internet users, or clients, utilizing software on personal computers ("client software") such as a web browser, may access a particular web site merely by selecting the particular URL.

An important aspect of the Internet is the World Wide Web (WWW). The WWW comprises a collection of specialized servers on the Internet that recognize the Hypertext Transfer Protocol (HTTP). Generally, HTTP enables access to a wide variety of server files, or "content" using a standard language known as Hypertext Markup Language (HTML). The files may be formatted with HTML to include graphics, sound, text files and multi-media objects, among others.

Methods of conveying information or messages to attract attention to products and services on the Internet often comprise "repackaged" versions of traditional mass media advertising. Internet advertising typically consists of a "banner" appearing in and/or with documents and other information selected by the user. The objective is for the user to click on the advertiser's banner, (known as "clicking-through"), to access the advertiser's information on the Internet. This marketing strategy resembles a method of attracting an individuals attention by the headline of a print advertisement and drawing the person into reading the body copy.

Generally, approximately fifty-percent of Internet advertising appears in web browsers and search engines. These Internet tools comprise software utilized by Internet users to access, through an Internet access provider, desired documents and information, otherwise referred to generally as "content." An example of such a method is disclosed in U.S. Pat. No. 5,572,643 to Judson. The method includes displaying a web page having a link to a hypertext document located at a remote server. According to that method, following the user's selection of the link, the browser displays one or more messages during the time taken to download the selected document. Once the desired content appears, the message disappears.

While this method displays information or messages to a user, the message itself is typically unrelated to and detached from the downloaded content. Because the browser and/or search engine normally operate as initial steps the user must take to access desired entertainment information or other content, the user's interest in what appears on the screen displaying a browser or search engine is minimal as compared to the potential interest of the user when the message is shown during the display of the downloaded content itself. In other words, advertising presented on the Internet in this manner fails to benefit from an interesting content environment to stimulate the user's attention.

Another problem with conventional Internet advertising involves habits traditionally accepted by audiences in focusing attention on commercial messages. In the banner-to-click-through method of advertising, the user must make a voluntary, active effort to go beyond the information contained in the banner and view the complete information message of the advertiser located at the advertiser's site or other location on the Internet. This advertising approach falls outside the context of existing media behavior. By its nature, advertising is an intrusive rather than voluntary communication with a consumer.

Apart from the problems regarding the failure to adequately attract attention of an audience, conventional advertising models implemented on the Internet reflect relatively undesirable economic disadvantages as well. Within the current model, the cost per click-through to the advertiser is above levels that most consumer products and services marketers can afford to reach a prospective customer. This relatively high expense typically precludes entry into the Internet medium by manufacturers of consumer-packaged goods that would otherwise engage in advertising activities on the Internet. Accordingly, the majority of the advertising on the Internet involves messages for Internet and computer companies and large expenditure products such as automobiles.

Therefore, the need exists for a method and system of conveying information within user-selected content to increase the level of attention afforded by the information to the user. The need also exists for such a method and system to be economically viable to ensure availability to all marketed goods and services. The method and system of the present invention satisfies these needs.

SUMMARY OF THE INVENTION

The method and system of the present invention provides the capability of integrating information, such as a message or icon, into content selected by a user with an appropriate scale. The inclusion of the message into the content itself substantially improves the level of attention afforded the message by the user. As a result, the message is more likely processed and retained cognitively by the user to influence the consumer attitudes, behavior or achieve the other effects sought by the advertiser. Moreover, the method and system of the present invention may be implemented in the standard Internet architecture with minimal hardware and software costs.

To realize the above described advantages, the invention, in one form, comprises a method of conveying information to a user in specified content displayed in an interactive graphical environment. The information comprises a predetermined message defined by message parameters to create an image and stored in a message memory. The content includes predetermined specifications for assimilating said message. The method comprises the steps of retrieving the specified content from a content memory then identifying the predetermined specifications from the content for substituting a portion of the content into a transformed representation of the predetermined message. After retrieving and identifying, the predetermined message is obtained from the message memory and transformed into a scaled message according to the specifications to substitute the message into the content portion and define a modified environment. After substitution, the method concludes by communicating the modified environment to the user, whereby the message, having been assimilated into the content, attracts substantial attention to effect improved cognitive processing and recall.

In another form, the invention comprises an interactive system for assimilating information in user specified content and displaying the content in a graphical environment through a computer network to a user. The information comprises at least one message for attracting attention to enhance cognitive processing and recall and stored in a message memory connected to the network. The content includes predetermined specifications for assimilating the message. The system includes means for retrieving the specified content from a content memory and means for identifying the predetermined specifications for substituting a portion of the content into a transformed representation of the predetermined message. The system further includes means for obtaining the predetermined message from the message memory and means for transforming the predetermined message into a scaled message according to the specifications to substitute into the content portion and define a modified environment. Also included is a means for communicating the modified environment to the user whereby the message, having been assimilated into the content, attracts substantial attention to effect improved cognitive processing and recall.

In yet another form, the invention comprises an object manager for use in an interactive system to transform user selected content into modified content conveying information comprising at least one message for attracting attention. The object manager includes means for retrieving scale information concerning a predetermined scale factor of the content portion and means for scaling the information according to the scaling factor. Also included is a means for integrating the scaled information into the content.

Other features and advantages of the present invention will be apparent from the following detailed description when read in conjunction with the accompanying drawings.

BRIEF DESCRIPTION OF THE DRAWINGS

FIG. 4b is a function diagram illustrating further steps in the method of FIG. 4a;

DETAILED DESCRIPTION OF THE INVENTION

Figure 1:
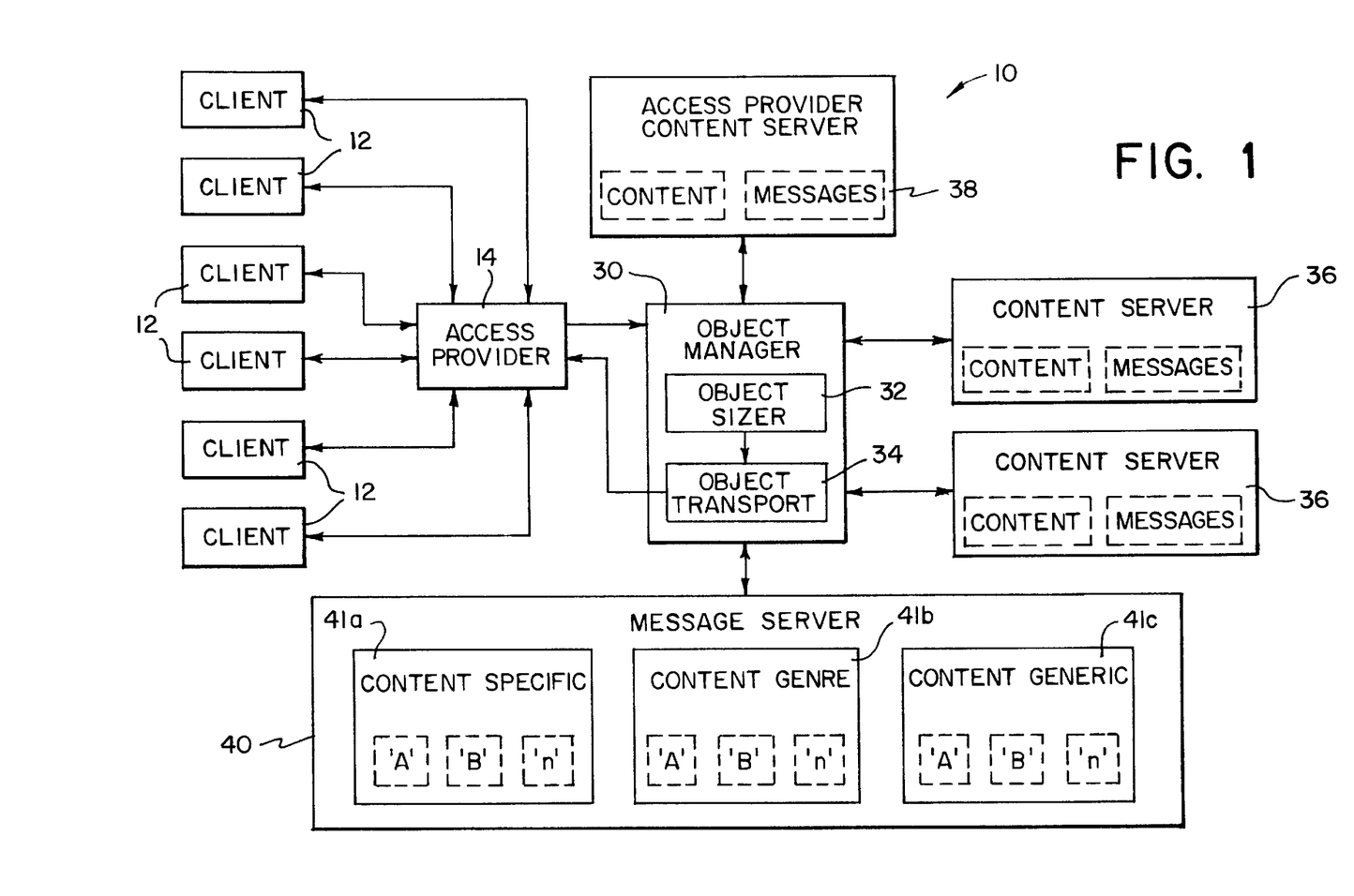
FIG. 1 is a block diagram of an interactive communications system according to a first embodiment of the present invention.
Figure 2:
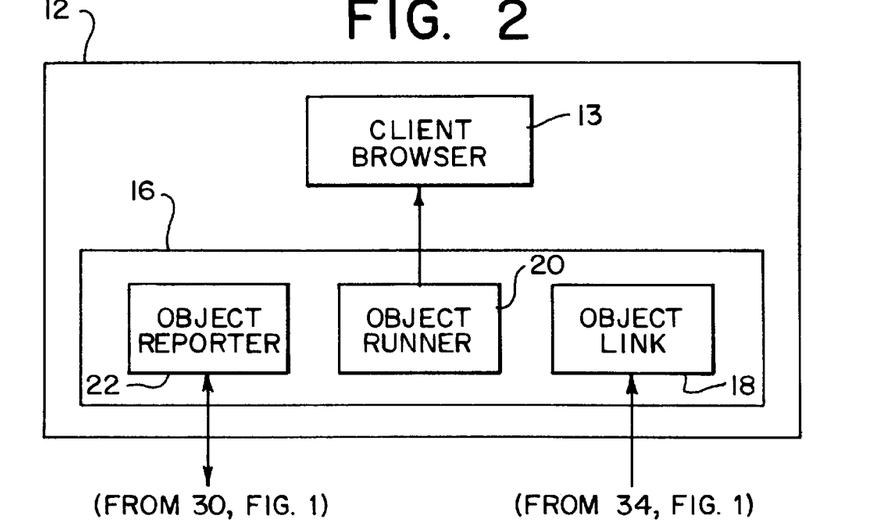
FIG. 2 is a block diagram of the client of FIG. 1.

Referring now to FIGS. 1 and 2, an interactive system according to a first embodiment of the present invention is shown utilizing the basic architecture of the Internet. The system comprises a computer network, generally designated 10, having an object manager 30 which scales and integrates information such as a message from a message server 40 or content servers 36 and 38 into selected content retrieved from a content server 36 or access provider content server 38. Content may be stored either on the access provider content server 38 or content servers hosting web sites 36. Likewise, messages may be stored on any content server and/or a message server.

The system 10 includes at least one user or client 12 comprising a computer running under an HTML compliant web browser 13 (FIG. 2) that supports a graphical user interface to display formatted files or content. The computer includes an interactive communications device such as a modem or line such as a cable (not shown) responsive to commands initiated by the user or host server through software to establish communication with a remote Internet access provider 14 or on-line Internet service.

Referring more particularly to FIG. 2, the client 12 includes software defining an object placer 16 that works in conjunction with the web browser to enable specific information, or messages, to appear in the selected content in a scale corresponding to the relative feature sizes displayed in the content and in the specific locations designated. The object placer includes an object link 18 for receiving requests from an object transport 34 which is a function of the object manager 30. An object runner 20 displays the information in a predetermined location pursuant to specifications programmed into the content, and according to a selected scale determined by the object manager. An object reporter 22 dynamically communicates with the object manager. The object reporter provides specific information to the object manager so that the object manager can in turn manage interactive capabilities with particular content.

With reference to FIGS. 1 and 2, the object manager 30 communicates through the Internet via an access provider 14 and replies to requests and initiates instructions to the client according to the method of the present invention. Included in the object manager is an object sizer 32 for resizing graphic images to match the relative feature scale included within the selected content. To control the transmission of messages to the client, the object manager employs an object transport 34. The object manager preferably takes the form of software, such as an application program, daemon, plug-in, but may also be implemented in hardware in the form of a web server.

With continued reference to FIG. 1, the object manager 30 is connected to one or more content servers 36 or access provider content servers 38 via a computer network. The servers 36 and 38 are responsive to requests made by the browser, through the object manager, to transmit respective web site documents selected by the user. The documents are typically formatted in HTML to provide specific content when viewed through the selected browser. In accordance with the present invention, however, the selected content is also programmed with HTML specifications identifying selected parameters for integrating a message retrieved from a message server 40 or content server into a predetermined portion of the content. The invention has utility, however, when implemented in other languages, HTML being a presently preferred mode. In this way, the physical features of the message correlate with the physical features of the content. The specifications preferably include a scaling factor to identify the relative size range of the content features, as well as the coordinates in the content where the message will be integrated. Moreover, to more flexibly integrate the messages into two-dimensional, or perspective environments, the scaling factor may include parameters defining the perspective orientation of the physical location within the graphic image. Examples of commands for practicing the present invention in HTML are shown in Table I below.

TABLE I

Message Server Commands

| | |
|---|---|
| parseObj {objID[, objID...]} | Query MS for Object (objID), not in local OD |
| initMS [sessionID] | Contact MS [with session ID#] |
| reqMODcheck | Request a checksum, compare local OD with master OD [MOD] |
| initRepl [sessionID] | Begin OD replication, transfer control to initStream(), pass [sessionID] |
| listen [port] | Open up a listen, [specified port]; watch for broadcasts from MS |
| doCRC {#} [, [16,32]] | Perform CRC-16, or CRC-32 checksum on local OD, file reference (#) |

Object Manager Commands

| | |
|---|---|
| aLink (bType, cMem, aEnabled) | Start Link, initiate session ID# and get standard client information (Browser [bType], client memory [cMem], [Aries] enabled? [aEnabled] |
| eLink [#] | End Link [#], terminate link, return status (stat) to host |
| xLink(stat) | Exit Link, return status (stat) to client |
| initStream [(v), wSize] | Begin streamed data transfer [v], defaults to maximum window size supported by current transport. Forced window size [wSize] may be specified if necessary. |
| statStream(v, {stat}) | Return status (stat) of stream(v) to host, test of OK to proceed with doStream |
| closeStream(v) | Close stream (v) |

TABLE I-continued

Object Placer Commands

| | |
|---|---|
| doStream[(v)], wSize] | Send streamed data frame for thread [v], usinq current (default) or specified window size |
| await [#ticks \| readyState] | Wait specified # clock ticks, or until OM receives a CTS signal from the client |
| killStream [(v)], p] | Kill runaway stream (v), priority level (p) |
| gObject [#] | Get object # |
| nObject | New object, returns object # |
| dObject [#], #...] | Delete object #, specify single or range of object numbers |
| sObject [#,X, Y, Atab] | Send Object #, X Axis, Y Axis, Attribute Table |
| pObject [#] | Send Pulse to Object # |
| gObject [#, Val] | Query Object #, Function returns Val as state |
| mObject [#, X, Y, Atab] | Move/resize Object #, X Axis, Y Axis, Attribute Table |
| cSize [#, Atab] | Resize Object #, Attribute Table |
| zRot [#, dRad[,loop{boolean}] | Rotate specified object[#], degrees in radians [loop] |

With continued reference to FIG. 1, the message server 40 is connected to the same network as the object manager 30 and the content servers 36 and 38. The message server stores and transmits files representing one or more messages such as content specific messages 41a, content genre messages 41b, and content generic messages 41c for integration into the desired content according to the predefined HTML specifications. Using HTML tags, the locations within the content are identified where messages can replace, overlay, add to, mask, or otherwise display information existing at those specified locations or be displayed in the foreground if the object placer 16 (FIG. 2) receives instructions to do so when processing the content for viewing by the client. Alternatively, the messages may be stored on the content server 36 (shown in phantom).

Information according to the present invention may be grouped according to particular advertising strategies. For example, the information conveyed may comprise a sequence of messages, distributing them within a single content experience. In other words, multiple messages—each somewhat different—may be displayed at one or more locations of a particular web page or web site over time. Alternatively, one or more messages may be configured to require consumer on-line interaction with the message, such as by requesting a user to "click-on" an icon, which may then morph to fully carry out the message. Also, a strategy of creating one or more brand messages within a sequence may be used to mirror the on-line content in which the message is integrated. This may be done, for example, by including kitchen related products within content illustrating a kitchen environment as is described in more detail below.

Figure 3:
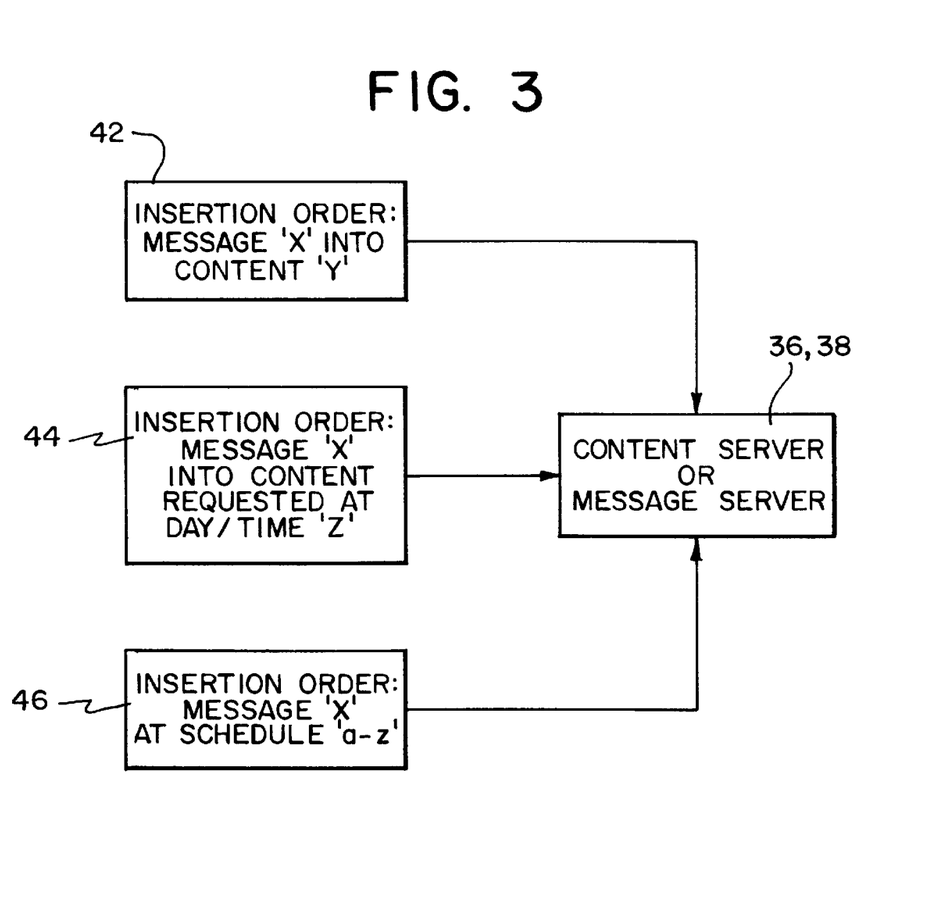
FIG. 3 is a function diagram illustrating insertion orders according to the invention for the interactive system of FIG. 1.

Referring now to FIG. 3, once the message has been generated for insertion into specific content, an insertion order 42 is prepared to facilitate scheduling of the message dissemination. For example, depending on the marketing strategy intended, the message may be inserted into whatever content is requested at a given day and time, this information is stored as at 44, and the schedule of messages then may be inserted within a given time period, by storing such information as at 46. In any case, an order to insert a message is generated and transmitted to either the content server 36 or the message server 38. Information management and storage preferably is achieved through conventional software programming techniques.

Figure 4A:
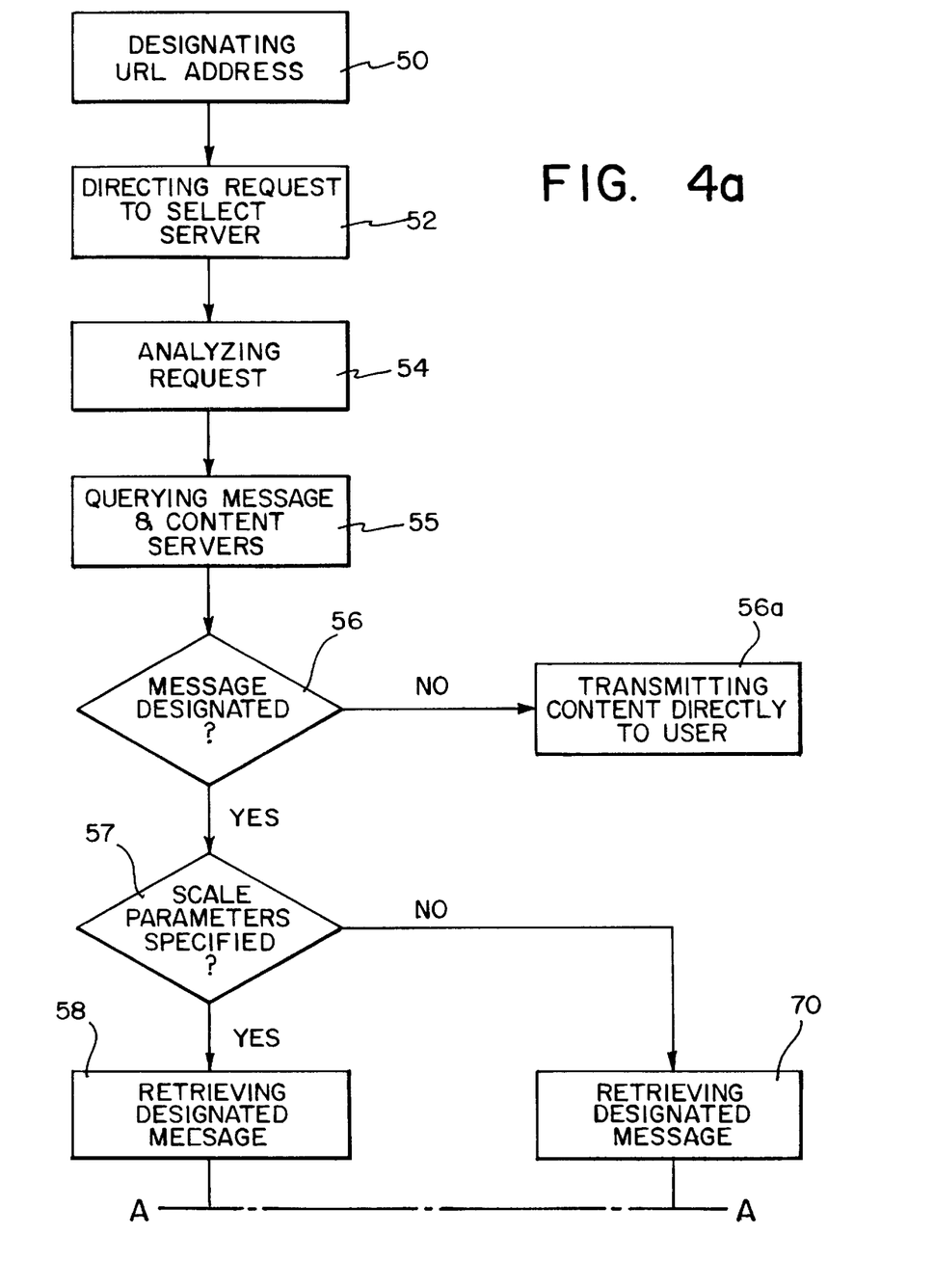
FIG. 4a is a function diagram illustrating steps according to one embodiment of the method of the present invention.
Figure 4B:
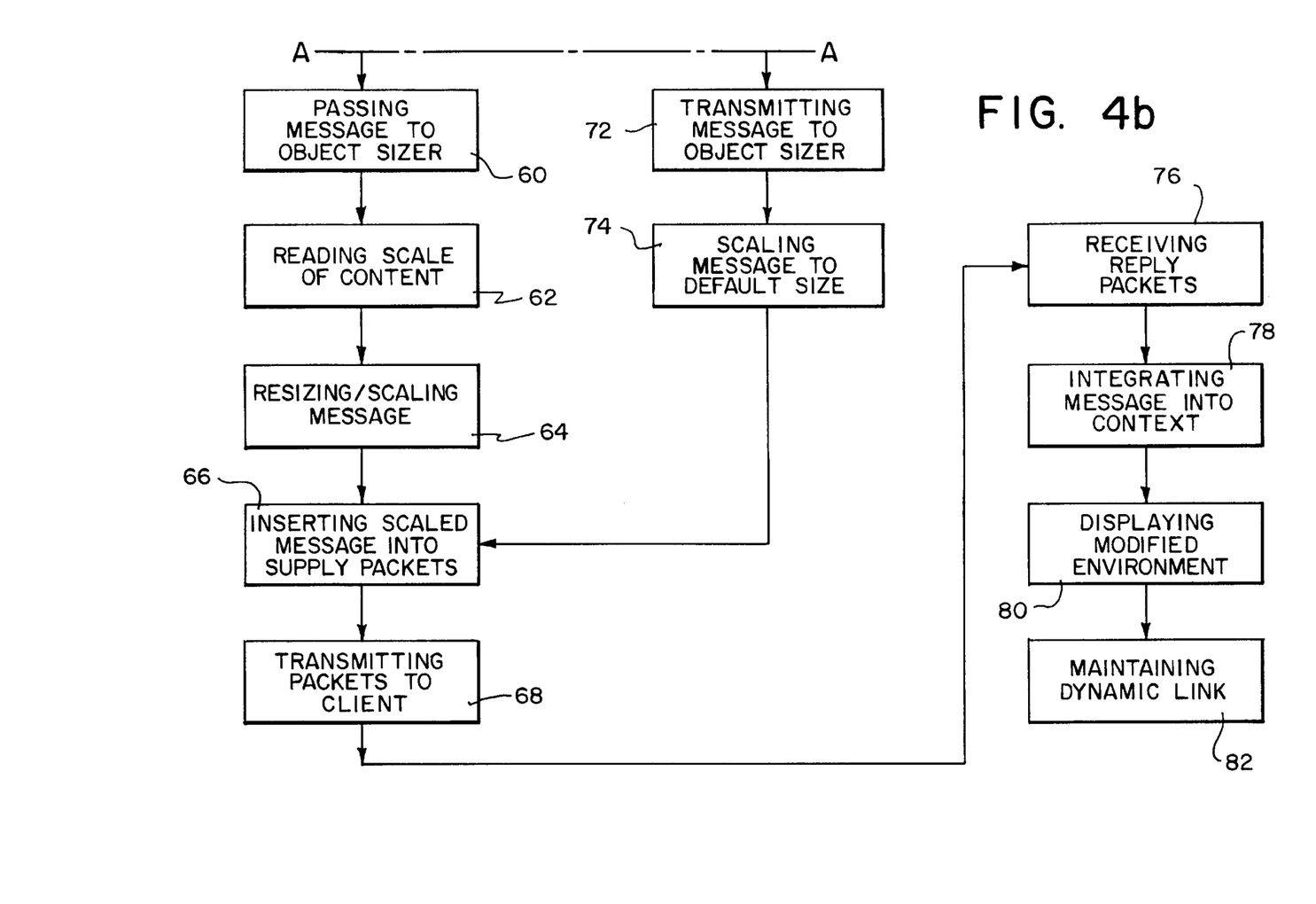

Referring now to FIGS. 4a and 4b, the method of the present invention according to one embodiment, includes steps that define the operation of the system 10 described above. A client session begins when a user selects a desired web page by designating the corresponding server's URL address, at step 50. This is accomplished either by typing the address in the specified location of the browser display and initiating a "go to" command or by clicking on an identified link in a web page. The browser, in response to the command, then directs a request, at step 52, to the corresponding server residing at the selected address.

The object manager 30 (FIG. 4a) monitors or listens to all server requests, at step 54. The object manager then queries the message server, content server, or local internal file, at step 55, to determine whether a message has been designated for integration with the content that has been requested. If a message has been designated for integration with the content, at step 56, the object manager then determines, at step 57, whether a scale parameter for that content has been specified. If a message has not been designated, the content is transmitted in a conventional manner to the user (step 56a). If a scale parameter is specified, the object manager retrieves the designated message, at step 58, and passes it to the object sizer 32, at step 60. The object sizer reads the size or scale of the content from the object manager, at step 62, and resizes the message, at step 64. The rescaled/resized message is then inserted by the object manager, at step 66, into the reply packets containing the content. The reply packets are then transmitted, at step 68, by the object transport 34 and downloaded to the client 12.

If the scale of the content is unspecified, the object manager 30 retrieves the designated message, at step 70, and transmits it to the object sizer 32, at step 72, for the message to be scaled, at step 74, according to a predetermined default size. The re-sized and rescaled message is then inserted by the object manager, at step 66, into the reply packets for transmission to the client at step 68.

Referring now to FIG. 4b, the reply packets transmitted by the object transport 34 are received by the object link 18, at step 76, in the object placer 16. The object runner 20 integrates the message into the content, at step 78, in the size provided by the object manager and location designated in the content. The message and content may then be displayed as a modified environment, at step 80, providing for example, text, graphics, animation, sound, video and pass on JavaScript or 3D objects that may be used in the message. The object reporter 22 (FIG. 2) maintains a dynamic link, at step 82, with the object manager during display.

Figure 5A:
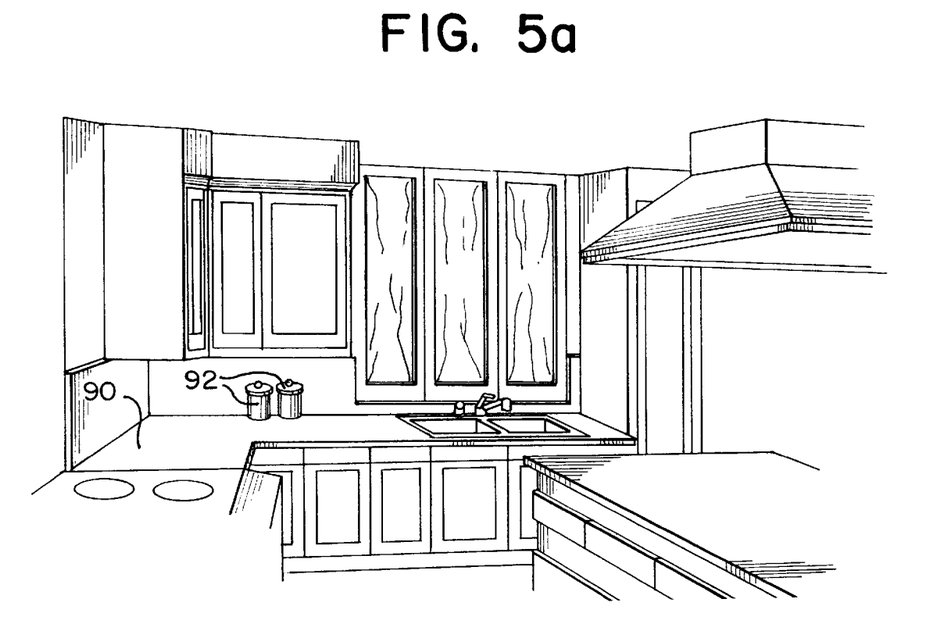
FIG. 5a illustrates a selected image for display.
Figure 5B:
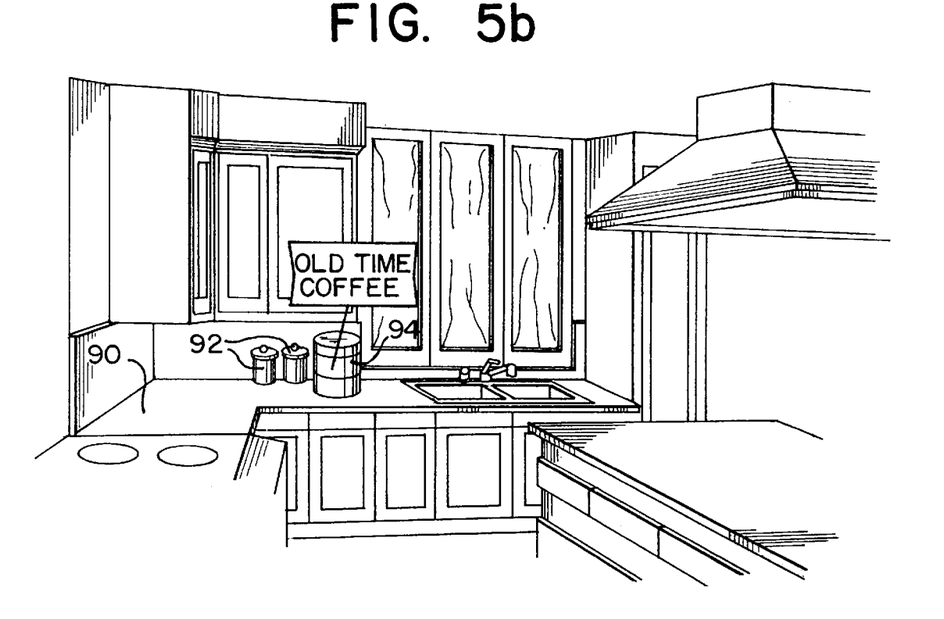
FIG. 5b illustrates an image of a scaled message integrated into the selected content of FIG. 5a according to the present invention.

An example of a message conveyed in accordance with the present invention is shown in FIGS. 5a and 5b. The selected content of FIG. 5a here comprises, initially, a kitchen environment having a counter-top 90 visually supporting a pair of counter-top objects 92. Referring to FIG. 5b, a message appears positioned adjacent the objects, and comprising a correspondingly sized coffee container 94 labeled with a manufacturer's brand name. Because the container is integrated into the displayed kitchen environment, due to the integrating step 78, the attention given by the user generates a higher level of cognitive processing and recall, creates a positive association and has other advertising benefits that, in the long run, should significantly affect the user's purchasing behavior.

Figure 6:
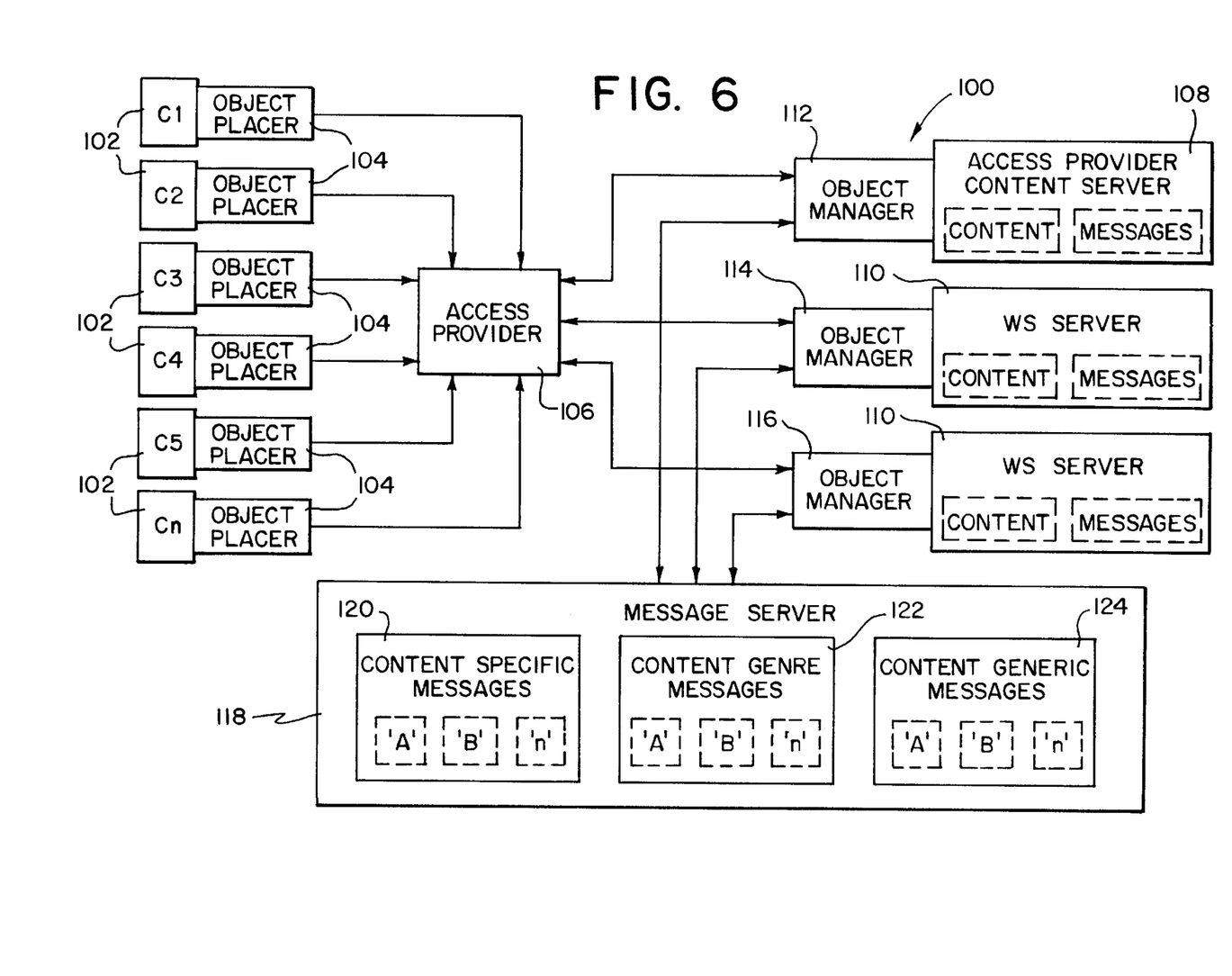
FIG. 6 is a block diagram of an interactive communications system according to a second embodiment of the present invention.

Referring now to FIG. 6, an interactive system according to a second embodiment of the present invention, generally designated 100, incorporates a similar architecture to that described in the first embodiment. The system includes one or more clients 102 having, respectively, an object placer 104 and operating through a web browser to communicate with an access provider 106 to a selected access provider content server 108 or web site server 110. The respective servers include respective resident object managers 112, 114 and 116 that connect through a message server 118 to integrate content specific messages 120, content genre messages 122 or content generic messages 124 into the selected content.

Operation of the interactive system of the present invention proceeds very similarly to that of the first embodiment. However, instead of having a single object manager implemented with a stand-alone server to listen to each request, only the respective object manager resident with the specified content server listens to the request to perform the message-to-content transformation. In all other respects, the system operates similar to that of the first embodiment.

Downloading messages from the servers typically takes place after a third party such as an advertiser compensates the owner, publisher, and/or distributor of the content for the right to include the message within the content. Either directly or through an agent, the advertiser or other third party prepares and produces the message and stores the message on a message server in a useable format.

The programmed messages may take a myriad of forms, such as static or animated icons, 2D and 3D graphics and animation, text, audio recordings or any object that may stand alone or be imbedded. Additional types of messages include future objects that have modular forms, or any objects that may be created. The messages also may include platform-independent application objects to morph within the content when displayed, such as applets written in JavaScript. The applets reside on the server as a component of the message and are downloaded with the message to the client browser.

Those skilled in the art will appreciate the many benefits and advantages afforded by the present invention. Of significant importance is the scaled integration of a message with correspondingly sized features in a selected environment specified by a user to maximize attention to the message. Attracting attention to a message in this manner substantially increases the cognitive processing and subsequent recall of the message, creates a positive association and has other advertising benefits, thereby tending to influence buying behavior.

Another advantage of the present invention is the straightforward adaptability of the system components and steps to existing network architectures. Consequently, implementation of the invention requires only a minimum amount of additional hardware, with most features conveniently employable in the form of software. By minimizing the use of additional hardware, the costs necessary to implement the invention are minimal.

In addition to contributing to minimal hardware costs, the capability of attracting high quality attention to messages from a significant number of users will provide pressure to lower the costs of advertising on the Internet.

While the invention has been particularly shown and described with reference to the preferred embodiments thereof, it will be understood by those skilled in the art that various changes in form and detail may be made therein without departing from the spirit and scope of the invention.

For example, while the method and system of the present invention have been described in the context of the Internet, it is anticipated that the invention may be employed in any interactive environment. Such environments include relatively small-scale intranets in addition to personal computer systems running CD-ROM devices effecting interactive communication.

What is claimed is:

1. A method for conveying to a user at least one predetermined message within a specified content displayed in an interactive graphical environment, said predetermined message having message parameters defining an image and being stored in a message memory, said method comprising the steps of:

retrieving said content from a content memory;

obtaining predetermined specifications programmed into said content including coordinate information defining a location within said content and a predetermined scale factor associated with the location;

obtaining said message from said message memory;

scaling said message according to said predetermined scale factor of the location in said content to create a scaled message;

automatically integrating said scaled message into said content at the location to define a modified environment; and communicating said modified environment to said user.

2. A method according to claim 1 wherein said message comprises an icon having a baseline size, said scaling step comprising scaling said icon from the baseline size to one of a plurality of sizes for integration into any one of a plurality of specified contents.

3. A method according to claim 1 wherein:

said scale factor relates to the perspective orientation of the location within the content at which said message is to be integrated.

4. A method according to claim 1 wherein said message parameters further include scheduled display periods for conveying said message, said communicating step including the step of displaying said modified environment pursuant to said scheduled display periods.

5. A method according to claim 4 wherein said displaying step includes the steps of:

receiving data representing said modified environment using a web browser; and formatting said data to form an image comprising said modified environment.

6. A method according to claim 5 wherein:

said message parameters and predetermined specifications comprise Hypertext Markup Language (HTML) instructions; and said web browser comprises an HTML compliant processor for responding to said parameters and instructions.

7. A method according to claim 1 wherein said at least one predetermined message comprises a sequence of messages.

8. A method according to claim 1 and further including, after the step of communicating, the step of:

enabling said user to respond to said message.

9. The method as in claim 8, wherein the enabling step comprises a dynamic link between the interactive graphical environment at the client side and a server at the server side.

10. A method according to claim 1 wherein:

said content relates to a particular genre, and said information relates to said particular genre.

11. A method for transforming a message icon for assimilation into a graphical image portion of content that is to be displayed on a display screen of a computer system having a memory, said method comprising the steps of:

retrieving coordinate information programmed into said content, said coordinate information defining a location within said image;

retrieving scale information associated with said location within said image;

scaling said message icon in accordance with said scale information;

automatically assimilating said scaled message icon into said image at said location; and displaying said scaled message icon at said location within said image.

12. A method according to claim 11, wherein said message icon has a base-line size and is scalable to one of a plurality of sizes for assimilation into any one of a plurality of images.

13. The method of claim 11, wherein said image includes representations of physical features with relative sizes, said scale information comprising a scale factor which correlates with the relative sizes of said physical features proximate said location in the image.

14. A method according to claim 13 wherein:

said scale factor relates to the perspective orientation of the physical location within the content at which said message is to be included.

15. An interactive system for assimilating a message into user specified content and for displaying said content and at least one message in a graphical environment through a computer network to a user, said message being stored in a message memory connected to said network, said content including coordinate information defining a location within said content and a predetermined scale factor associated with the location programmed therein, said system including:

means for retrieving said content from a content memory;

means for obtaining said coordinate information and said predetermined scale factor associated with the location defined by the coordinate information;

means for obtaining at least one said message from said message memory;

means for transforming said obtained message into a corresponding scaled message in accordance with said predetermined scale factor;

means for automatically including said scaled message into said content at the location to define a modified environment; and means for communicating said modified environment to said user.

16. An interactive system according to claim 15 wherein:

said means for retrieving comprises an object manager.

17. An interactive system according to claim 16 wherein:

said object manager comprises a stand-alone server.

18. An interactive system according to claim 16 wherein said object manager resides on a server having both said content memory and said message memory.

19. An interactive system according to claim 16 wherein:

said means for communicating includes an object placer connected in networked communication with said object manager and cooperating with a network navigator to receive data from said object manager and format said data to form an image comprising said modified environment.

20. An interactive system according to claim 19 wherein:

said object manager includes an object transport; and said object placer includes an object link for receiving transmissions from said object transport, an object runner for displaying said message according to said coordinate information and said predetermined scale factor, and an object reporter for dynamically communicating with said object manager.

21. An interactive system for attracting attention to an advertisement, said system including:
- a web browser for transmitting content requests from a user to a computer network over a communication path, said web browser including an object placer;
- at least one content server which stores content together with predetermined specifications for assimilating said advertisement into said content, said specifications including a scaling factor representative of the relative size of graphical features in said content and location coordinates for designating the position of said advertisement in said content;
- at least one message server which stores said advertisement, said advertisement including an image defined by predetermined message parameters;
- an object manager communicatively connected to said respective content and message servers and operative to retrieve said content and advertisement from said respective content and message servers and to transform said advertisement into a scaled message according to said scaling factor for automatically integrating said scaled message into said content at said location coordinates for subsequent transmission to said web browser.

22. The system as in claim 21, wherein said object placer includes an object reporter in communication with said object manager, said object reporter managing interaction with between the user and said computer network.

23. An object manager for use in an interactive system which automatically transforms user selected content into modified content which conveys at least one message for attracting the attention of the user, said object manager including:
- means for retrieving a scale factor associated with a coordinate location defining a location within said content, said scale factor being programmed into said content;
- means for scaling at least one said message according to said scaling factor; and
- means for automatically integrating said scaled message into said content at the defined location.

* * * * *